United States Patent Office 3,394,167
Patented July 23, 1968

3,394,167
PRODUCTION OF ACRYLONITRILE AND METHACRYLONITRILE
Christof Palm and Rolf Platz, Mannheim, and Heinz Nohe, Ludwigshafen (Rhine), Germany, assignors to Badische Anilin- & Soda-Fabrik Aktiengesellschaft, Ludwigshafen (Rhine), Germany
No Drawing. Filed July 21, 1965, Ser. No. 473,826
Claims priority, application Germany, July 25, 1964, B 77,837
14 Claims. (Cl. 260—465.3)

ABSTRACT OF THE DISCLOSURE

Production of acrylonitrile or methacrylonitrile from propylene or isobutylene by ammonoxidation at elevated temperature on supported catalysts containing as active materials molybdenum and tin oxides and promotors, the catalysts being prepared by impregnating the support with a solution of said metals or metal oxides in concentrated sulphuric acid and drying the resultant impregnated catalyst at a temperature sufficient to evaporate substantially all of said sulphuric acid.

---

This invention relates to the production of acrylonitrile or methacrylonitrile from propylene or isobutylene by oxidation with oxygen or oxygen-containing gases in the presence of ammonia. More specifically, the invention relates to the use of new catalysts in the said reaction.

It is known that $\alpha,\beta$-unsaturated nitriles can be prepared from $\alpha,\beta$-unsaturated alkenes by oxidation with oxygen in the vapor phase in the presence of ammonia over various catalysts. The prior art catalysts contain in particular phosphates, molybdates and tungstates in complex form with certain additives, so that salts of heteropolyacids may usually be assumed to be the active constituents. Examples of such catalysts are given as bismuth, tin and antimony salts of molybdic acid, phosphomolybdic acid and phosphotungstic acid in U.S. patent specification No. 2,904,580. In U.S. patent specification No. 2,691,037 metals, oxides or other compounds of copper, chromium, vanadium, manganese, iron, nickel, cobalt, molybdenum, silver, zinc, cadmium, tin, tungsten, rhenium, lead, platinum, gold, aluminum, palladium, rhodium, bismuth and uranium are specified quite generally as suitable and also all catalysts which are known for the oxidation of naphthalene to phthalic anhydride and of benzene to maleic anhydride.

Among this large number of catalytic elements, however, only a few can be regarded as actually useful, namely those combinations which yield acrylonitrile or methacrylonitrile to the extent of about 5% by volume in the gas mixture when the gas is passed over the same under favorable conditions. In the case of all the prior art catalysts, polymerized products which lead to resinification and stoppages in the equipment are formed to a considerable extent by secondary reactions. Such resinification and stoppages of industrial equipment make necessary repeated interruptions in operation and much additional labor for cleaning the equipment.

It is an object of the present invention to provide an improved process for the catalytic production of acrylonitrile from propylene, oxygen and ammonia. It is a further object of the invention to provide a more effective catalyst for the production of acrylonitrile from propylene, ammonia and oxygen in a one-stage reaction. Another object of the invention is to provide a catalyst for the manufacture of acrylonitrile which catalyst has been prepared by a new method. These and other objects and advantages of the invention will be better understood from the following detailed description.

We have found that in the production of acrylonitrile or methacrylonitrile from propylene or isobutylene by oxidation with oxygen or oxygen-containing gases in the presence of ammonia at elevated temperature using catalysts containing molybdenum oxide and tin oxide, and which may also contain boron oxides, higher space-time yields of acrylonitrile or methacrylonitrile are obtained and a longer life of the catalyst is achieved by using a supported catalyst which has been prepared by impregnating the carrier with a solution of the said metal oxides or the corresponding salts in concentrated sulfuric acid, followed by drying and if desired by thermal decomposition of the metal sulfates formed.

The composition of the supported catalysts which are suitable for the synthesis of acrylonitrile and methacrylonitrile is known and forms the subject of prior applications for Letters Patent. Thus for example catalysts containing molybdenum and tin oxide may be used in which the ratio of $MoO_3$ to $SnO_2$ is from about 10:1 to 1:10, preferably 2:1 to 1:2. Particularly suitable active constituents are tin salts of boromolybdato heteropolyacids such as are described for example in Belgian patent specification No. 698,603. These tin salts have for example the formula $Sn_5[BO_4Mo_{12}O_{18}(OH_{36}]_2$ which corresponds to an analysis of 12.28% of Sn, 0.5% of B and 47.5% of Mo, or 17.6% of $SnO_2$, 1.63% of $B_2O_3$ and 80.7% of $MoO_3$. Naturally in addition to the tin boron molybdic acid, an excess of one or other component may be present, for example tin molybdate, tin borate, boron molybdate or boric acid alone, so that mixtures of tin salts of boromolybdato acid are present with the other components. Generally the weight ratio of tin(IV) oxide to molybdenum oxide is 10:1 to 1:10, preferably 2:1 to 1:2, and of boron oxide to molybdenum oxide from 1:2 to 1:50, preferably 1:2 to 1:10.

Silica gel is preferred as the carrier, but diatomaceous earth, pumice, carborundum, aluminum oxides or aluminum silicates may be used. The proportion of carrier may vary within wide limits, for example from 30 to 95% by weight; it is advantageous to use about 65 to 90% by weight of carrier material.

Production of the catalyst may take place for example by impregnating the carrier with an appropriate solution of metal oxide or salt in concentrated sulfuric acid followed by evaporation of the sulfuric acid, or by application of the sulfuric acid solutions in a coating apparatus, or by spraying the sulfuric acid solutions for example into a heated fluidized bed formed from the carrier. In accordance with this invention, solutions of the oxides of the said metals include solutions of the metals, the oxides or metal salts or of other compounds of the metals in concentrated sulfuric acid. Examples are solutions of tin, tin(II) oxide, tin(II) chloride or acetate, boric acid, molybdic acid, ammonium-molybdic acid, ammonium molybdate, molybdenum trioxide and/or boron trioxide.

Usually concentrations of 20 to 30% of metal sulfates (reckoned as oxides) in the sulfuric acid are used. The concentrated sulfuric acid itself should be from about 95 to 100% strength. A content of sulfur trioxide, for example up to 25% by weight, is not detrimental but on the other hand does not offer any advantage.

The carrier is impregnated with the sulfuric acid solutions of metal salts until the desired amount of metal salts has been applied to the carrier. The high solubility of the said metal salts in concentrated sulfuric acid is a great advantage.

The particle size of the carrier is determined, depending on the method of production, by spraying, extrusion or grinding. For the fluidized bed method, a particle size of 0.05 to 0.4 mm. is in general preferred, while for stationary bed catalysts particle sizes of 1 to 5 mm. are advantageous.

The catalysts which have been impregnated with metal oxide or metal salts are either merely dried, i.e. the sulfuric acid is evaporated at temperatures up to 350° C., or it is subsequently calcined, for example at 400° to 700° C., so that the sulfuric acid is wholly or at least partly evaporated and a decomposition of the metal sulfates intermediately formed takes place. The metals will then be present in the form of their oxides in a very finely divided form on the carriers. In the case of catalysts for a fluidized bed process, the calcination advantageously takes place in a fluidized bed.

Known oxidation conditions are suitable for the process.

Propylene or isobutylene is used in pure form. Oxygen may also be used in pure form but in general air is used. The ammonia is also used in pure form. Inert gases, such as nitrogen, carbon monoxide or carbon dioxide, and also hydrocarbons, such as methane, propane, other alkanes or other saturated gaseous hydrocarbons which are inert under the reaction conditions have no detrimental effect. Steam may be added as an inert gas in many cases to regulate the reaction. The ammonia may be mixed at the start with the hydrocarbon, the oxygen and other gases used, but the ammonia may also be first mixed with the other reactants and inert gases in the reactor. This method is recommended when using a fluidized catalyst.

The ratio of olefin to oxygen and ammonia may be seen from the reaction equation:

$$R-CH_3 + 1.5O_2 + NH_3 \rightarrow R-CN + 3H_2O$$

in which R denotes the radical $CH_2=CH-$ or $$CH_2=C- \\ | \\ CH_3$$

Oxygen and ammonia may be used in excess.

Accordingly molar ratios of propylene (or isobutylene) to oxygen of 1:0.5 to 1:3, advantageously 1:0.7 to 1:1.8 and molar ratios of propylene (or isobutylene) to ammonia of 1:0.5 to 1:5, preferably 1:0.5 to 1:2 may be used. When the ratio of ammonia to propylene or isobutylene is substantially less than the molar ratio 1:1, oxygen-containing by-products form to an increased extent.

Since the process is usually carried out in the presence of inert gases, it is advantageous to use air as the source of oxygen. Steam, when added as an additional inert gas, is usually employed in an amount of 0.25 to 10 moles per mole or propylene or isobutylene. It is preferred to use gas mixtures which contain from about 1 to 25% by volume, particularly 4 to 10% by volume of propylene or isobutylene. The gases may also be recycled after the acrylonitrile or methacrylonitrile has been separated, and it is then advantageous to meter in ammonia in excess as inert gas instead of nitrogen and pure oxygen. The reaction is carried out at from 400° to 580° C., advantageously from 450° to 530° C.

The residence time of the gases in contact with the catalyst may vary; it is preferably about 0.5 to 3.5 seconds, particularly 1.5 to 2.5 seconds. The residence time is defined as the quotient of the catalyst volume in the quiescent condition and the gas volume under operating conditions. The catalyst may also be stationary; it is preferred however to keep the catalyst in fluidization.

The process is usually carried out at atmospheric pressure. It may however also be carried out under slightly subatmospheric pressure, for example at 400 mm. Hg, or under slight superatmospheric pressure, for example 2 atmospheres gauge.

The reaction is carried out in the conventional way by passing the reactants and any inert gas used at the reaction temperature over the catalyst, then cooling the reaction gas so that the water is condensed out, and then carrying out the separation of the nitrile by known methods, for example by washing with water or with organic solvents.

The advantages of the catalysts prepared according to the new process become evident in an increased space-time yield because the reaction may be carried out with increased concentrations of olefins and with shorter residence times. Moreover the catalysts have a considerably prolonged life which is attributable to an increased abrasion resistance and a lower volatility of the applied oxides.

The invention is further illustrated by the following examples. In Examples 1 to 5, yield, conversion and conversion rate are defined as follows:

$$\text{Percent yield} = \frac{\text{moles of compound formed}}{\text{moles of olefin used up}} \times 100$$

$$\text{Percent conversion} = \frac{\text{moles of compound formed}}{\text{moles of olefin supplied}} \times 100$$

$$\text{Percent conversion rate} = \frac{\text{moles of olefin used up}}{\text{moles of olefin supplied}} \times 100$$

EXAMPLES (a) Tin-boron-molybdate catalyst prepared according to this invention:

Catalyst A 117 g. of tin powder are dissolved in 1150 ml. of concentrated sulfuric acid by boiling and then 38.8 g. of boron trioxide and 114.8 g. of molybdenum trioxide are introduced. As soon as the solution becomes clear, the carrier to be impregnated (500 g. of silica gel, particle size 0.1 to 0.3 mm., bulk density 360 g./l.) is stirred in. Excess sulfuric acid is evaporated in a coating apparatus to such an extent that the granules flow freely, and then the impregnated silica gel is calcined at 400° to 450° C. in a fluidized bed reactor in a current of air. The sulfate content of the catalyst after having been calcined in the fluidized bed reactor for seven hours is 0.28%.

The composition of the catalyst is:

17.7% $SnO_2$ + 4.88% $B_2O_3$ + 14.5% $MoO_3$ + 53% $SiO_2$

Catalyst B (by the process of Belgian patent specification No. 698,603)

37.5 g. of ammonium molybdate is dissolved in 300 ml. of water by heating. 18.7 g. of boric acid is slowly introduced while stirring. Then a solution of 66.5 g. of tin chloride in 200 ml. of water is added. 200 g. of silica gel having a particle size of 0.05 to 0.4 mm. is then added immediately to the brown suspension formed, the liquid being completely absorbed. The catalyst is dried at 110° C. for three hours with air and fluidized for one hour with ammonia at 450° C. in a fluidized bed reactor.

The catalyst has the following composition:

15.6% $SnO_2$ + 3.7% of $B_2O_3$ + 10.7% $MoO_3$ + 70% $SiO_2$

Catalyst C 20.1 g. of ammonium molybdate, 100 g. of boric acid and 365 g. of tin(II) chloride are dissolved in 20 ml. of concentrated sulfuric acid and 1060 g. of silica gel is then stirred in. Excess sulfuric acid is evaporated in a coating apparatus to such an extent that the granules flow freely, and then the impregnated silica gel is calcined at 400° to 450° C. in a fluidized bed reactor in a current of air. The sulfate content of the catalyst after having been calcined in the fluidized bed reactor for seven hours is 0.28%.

Catalyst D 135 g. of SnO is dissolved in 1.7 l. of concentrated $H_2SO_4$ and 5 g. of boron trioxide and 125 g. of ammonium molybdate are introduced into the milky solution. As soon as the solution becomes clear, 750 g. of silica gel (particle size 0.1 to 0.3 mm.; bulk density 360 g./l.; obtained by spraying silica sol) is introduced. Excess sulfuric acid is evaporated in a coating apparatus to such an extent that the granules flow freely, and then the impregnated silica gel is calcined at 400° to 450° C. in a fluidized bed reactor in a current of air. The sulfate content of the catalyst after having been calcined in the fluidized bed reactor for seven hours is 0.28%.

The composition of the catalyst is:

14.9% $SnO_2$ + 0.5% $B_2O_3$ + 10.1% $MoO_3$ + 74.5% $SiO_2$ (b) Production of acrylonitrile:

Example 1

400 ml. of a finished annealed catalyst (prepared according to method A having the composition 8.2% $SnO_2$, 4.7% $B_2O_3$, 6.3% $MoO_3$ and 80.7% $SiO_2$, having a particle size of 0.1 to 0.3 mm. and a bulk density of 400 g./l.) is heated to a reaction temperature of 490° C. in a vertical reaction tube having a diameter of 60 mm. which is provided at the bottom with a gas-permeable frit. A mixture of 21 liters of propylene, 18 liters of ammonia, 150 liters of air and 40 g. of steam per hour is passed up through the catalyst. The gas mixture keeps the catalyst in fluidized motion. The residence time is 2.3 seconds.

The gas mixture has the following compositions:

8.8% by volume of propylene
7.5% by volume of ammonia
62.7% by volume of air and
20.9% by volume of steam.

The gas leaving the reactor is passed through a cooler to condense the steam and is then supplied to a scrubber to separate the acrylonitrile.

Determination of the acrylonitrile content is carried out direct in the reaction gas by infrared spectroscopy and gas chromatography.

By-products obtained are acetonitrile and hydrocyanic acid. The acrolein content, when using tin-boron-molybdenum catalysts, is less than analytical sensitivity limits, i.e. less than 50 p.p.m.

6.15% by volume of acrylonitrile, 1.1% by volume of acetonitrile and 1.8% by volume of hydrocyanic acid are detected in the reaction gas by gas chromatography. The yield of acrylonitrile (with reference to propylene reacted) is 72% and conversion to acrylonitrile (with reference to propylene supplied) is 58% in a single passage.

Analysis of the catalyst after a reaction period of 200 hours gave the values: 7.7% $SnO_2$, 3.9% $B_2O_3$, 5.9% $MoO_3$ and 82.5% $SiO_2$.

After 2000 hours, the catalyst still has the same activity, the acrylonitrile content in the reaction gas is 6.0%, the composition of the catalyst is still the same as at 200 hours, and the loss of catalyst by attrition and the like is 7%.

Example 2

For comparison, 400 ml. of the finished annealed catalyst prepared according to method B and having the composition therein stated with a particle size of 0.05 to 0.4 mm. is heated according to Belgian patent specification No. 698,603 to a reaction temperature of 500° C. in a vertical reaction tube having a diameter of 60 mm. which is provided at the bottom with a gas-permeable fritted glass disk. A mixture of 12 liters of propylene, 12 liters of ammonia, 90 liters of air and 80 liters of steam per hour is passed up through the catalyst. The gas mixture keeps the catalyst in fluidized motion. The residence time is 2.6 seconds.

The gas mixture has the following composition:

6.2% by volume of propylene
6.2% by volume of ammonia
9.3% by volume of oxygen
37.0% by volume of nitrogen and
41.3% by volume of steam.

The gas leaving the reactor is passed through a cooler to condense the steam and is then supplied to a scrubber to separate the acrylonitrile.

Determination of the acrylonitrile content is carried out direct in the reaction gas by infrared spectroscopy and gas chromatography.

Acetonitrile and hydrocyanic acid are obtained as by-products. The acrolein content in this case is also below the limits of analytical sensitivity, i.e. less than 50 p.p.m.

5% by volume of acrylonitrile is detected in the reaction gas by gas chromatography. The yield of acrylonitrile (with reference to reacted propylene) is 73.0%.

Conversion to acrylonitrile (with reference to propylene supplied) is 50.5% in a single passage.

After a reaction period of 2000 hours about 25% of the catalyst has been lost by attrition and the like and the composition is: 6.5% $SnO_2$, 1.3% $B_2O_3$, 4.5% $MoO_3$ and 87.6% of $SiO_2$. 4.5% by volume of acrylonitrile is found in the reaction gas. In continuous operation, the loss of 25% of catalyst must be compensated by filling up with fresh catalyst.

EXAMPLE 3

400 ml. of a finished annealed catalyst prepared according to method C and having the composition 16.5% $SnO_2$, 37% $B_2O_3$, 10% $MoO_3$ and 69% $SiO_2$ with a particle size of 0.1 to 0.3 mm. and a bulk density of 430 g./l. are heated to a reaction temperature of 490° C. in a vertical reaction tube having a diameter of 60 mm. which is provided at the bottom with a gas-permeable fritted glass disk. A mixture of 21 liters of propylene, 18 liters of ammonia, 150 liters of air and 40 g. of steam per hour is passed up through the catalyst. The gas mixture keeps the catalyst in fluidized motion. The residence time is 2.3 seconds.

The gax mixture has the following composition:

8.8% by volume of propylene
7.5% by volume of ammonia
62.7% by volume of air and
20.9% by volume of steam.

The gas leaving the reactor is passed through a cooler to condense the steam and is then supplied to a scrubber to separate the acrylonitrile.

Determination of the acrylonitrile content is carried out direct in the reaction gas by infrared spectroscopy and gas chromatography.

6.1% by volume of acrylonitrile, 0.8% by volume of acetonitrile and 0.9% by volume of hydrocyanic acid are detected in the reaction gas by gas chromatography. The yield of acrylonitrile (with reference to propylene reacted) is 71% and conversion to acrylonitrile (with reference to propylene supplied) is 56% in a single passage.

The acrolein content in the off-gases is below the limits of analytical sensitivity.

After 200 hours of operation analysis of the catalyst shows the composition 14.3% $SnO_2$, 2.9% $B_2O_3$, 9.8% $MoO_3$ and 73% $SiO_2$. After 2000 hours the catalyst still has the same activity, the acrylonitrile content in the off-gas is 6% by volume and the loss of catalyst by attrition and the like is 11%.

EXAMPLE 4

300 ml. of catalyst prepared according to method A and having a particle size of 0.1 to 0.3 mm. are heated to a reaction temperature of 480° C. in a fluidized bed reactor having a diameter of 60 mm. which is provided at the bottom with a gas-permeable fritted glass disk. A mixture of 12 liters of isobutylene, 12 liters of ammonia, 90 liters of air and 60 liters of steam per hour is passed up through the catalyst. The gas mixture keeps the catalyst in fluidized condition. The residence time is 2.2 seconds.

The gas mixture has the following composition:

6.9% by volume of isobutylene
6.9% by volume of ammonia 10.8% by volume of oxygen
40.9% by volume of nitrogen and
34.5% by volume of steam.

The gas leaving the reactor is cooled to −70° C. using intensive coolers and the organic phase is separated from the condensate and investigated by means of infrared spectroscopy and gas chromatography.

The yield of methacrylonitrile, based on isobutylene reacted, is 50% and the conversion, based on isobutylene supplied, is 26.3%.

Acrylonitrile, acetonitrile and hydrocyanic acid are obtained as by-products in amounts of 4%, 2% and 7%, respectively, based on methacrylonitrile.

EXAMPLE 5

When following the procedure described in Example 1 but using catalyst D 73% acrylonitrile, based on propylene, is obtained and the conversion to acrylonitrile, based on propylene supplied, is 58%.

We claim:
1. In a process for the production of R—CN wherein R is a member selected from a group consisting of $CH_2=CH-$ and

by the reaction of a member from the group consisting of propylene and isobutylene with a gas containing oxygen in free molecular form in the presence of ammonia at elevated temperature, the improvement which comprises employing therein as the solid catalyst, a composition derived by impregnating a solid carrier with a solution in concentrated sulphuric acid of compounds of the metals molybdenum and tin at a ratio of said metals, as $MoO_3$ and $SnO_2$, from about 10:1 to 1:10 in an amount sufficient to provide, in the final catalyst composition, 30–95 percent by weight of said carrier, and drying the resultant impregnated carrier at a temperature sufficient to evaporate substantially all of said sulphuric acid.

2. A process as claimed in claim 1 wherein said catalyst composition is calcined at 400–700° C.

3. In a process for the production of R—CN wherein R is a member selected from a group consisting of $CH_2=CH-$ and

by the reaction of a member selected from the group consisting of propylene and isobutylene with a gas containing oxygen in free molecular form in the presence of ammonia at elevated temperature, the improvement which comprises employing therein as the solid catalyst, a composition derived by impregnating a solid carrier with a solution in concentrated sulphuric acid of compounds of the metals molybdenum, tin and boron at a ratio of said metals, as $MoO_3:SnO_2$, of from about 10:1 to 1:10 and a ratio of boron oxide to molybdenum oxide from 1:2 to 1:50 in an amount sufficient to provide, in the final catalyst composition, 30–95 percent by weight of said carrier, and drying the resultant impregnated carrier at a temperature sufficient to evaporate substantially all of said sulphuric acid.

4. A process as claimed in claim 3, wherein said catalyst composition is calcined at 400–700° C.

5. A process as claimed in claim 1, wherein said ratio is 2:1 to 1:2.

6. A process as claimed in claim 3, wherein said ratio of said boron oxide to molybdenum oxide is 1:2 to 1:10.

7. A process as claimed in claim 1, wherein said solid carrier is silica gel.

8. A process as claimed in claim 3, wherein said solid carrier is silica gel.

9. A process as claimed in claim 1, wherein said amount of said carrier is 65–90 percent by weight.

10. A process as claimed in claim 3, wherein said amount of said carrier is 65–90 percent by weight.

11. A process as claimed in claim 1, wherein the concentration of said metals, as their oxides, in said concentrated sulphuric acid, is in the range of 20–30 percent.

12. A process as claimed in claim 3, wherein the concentration of said metals, as their oxides, in said concentrated sulphuric acid, is in the range of 20–30 percent.

13. A process as claimed in claim 1, wherein said concentrated sulphuric acid has a strength of 95–100 percent.

14. A process as claimed in claim 3, wherein said concentrated sulphuric acid has a strength of 95–100 percent.

References Cited

UNITED STATES PATENTS

| | | | |
|---|---|---|---|
| 3,282,982 | 11/1966 | Callahan et al. | 260—465.3 |
| 3,287,394 | 11/1966 | Young et al. | 260—465.3 |
| 3,293,279 | 12/1966 | Young et al. | 260—465.3 |

JOSEPH P. BRUST, *Primary Examiner.*